April 14, 1931.   W. D. DAVIDSON   1,800,513
GEAR REDUCTION DRAW WORKS
Filed Aug. 28, 1923   4 Sheets-Sheet 1
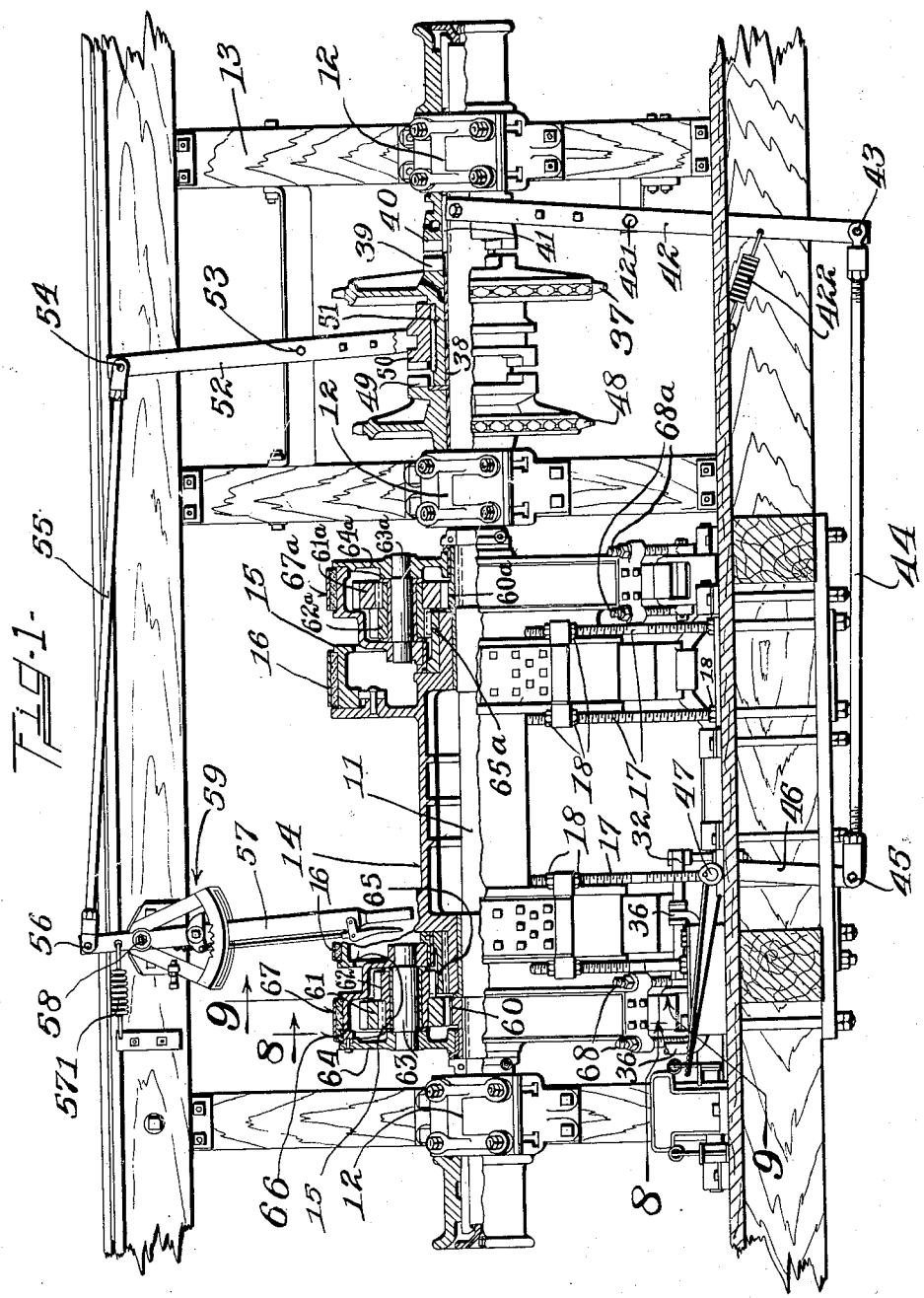
INVENTOR.
William D. Davidson,
BY Lyon & Lyon
ATTORNEYS

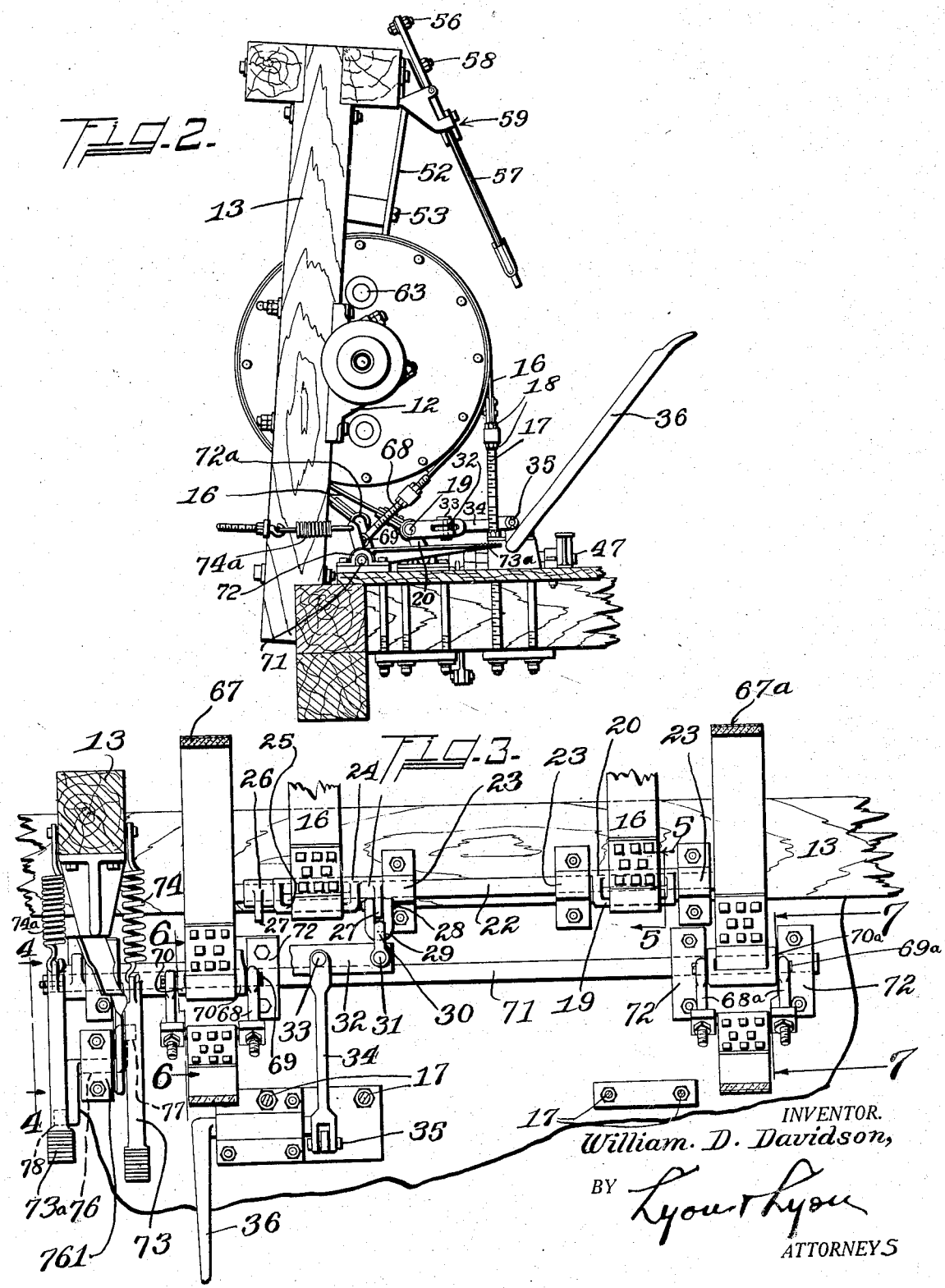

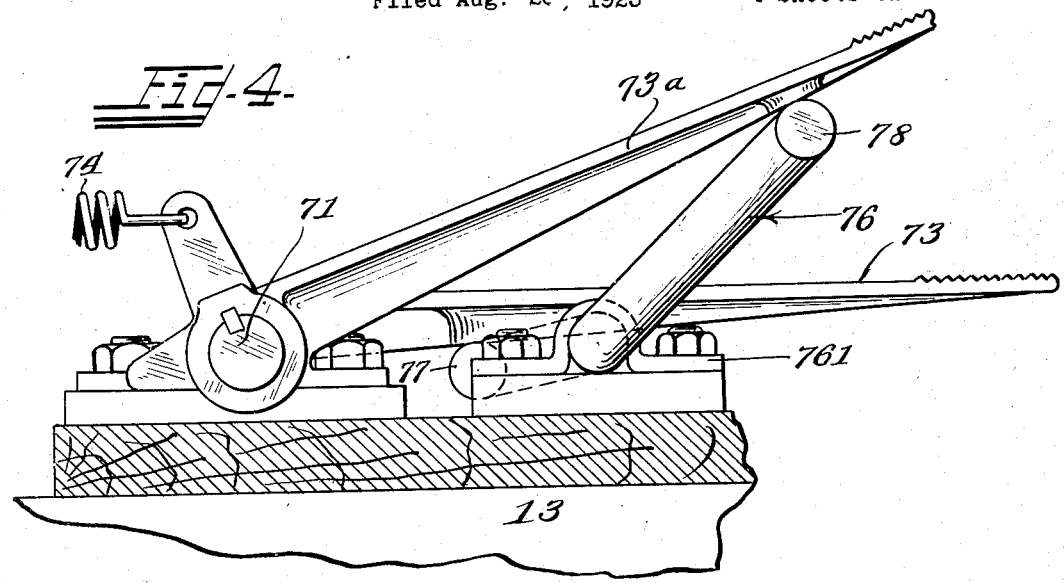
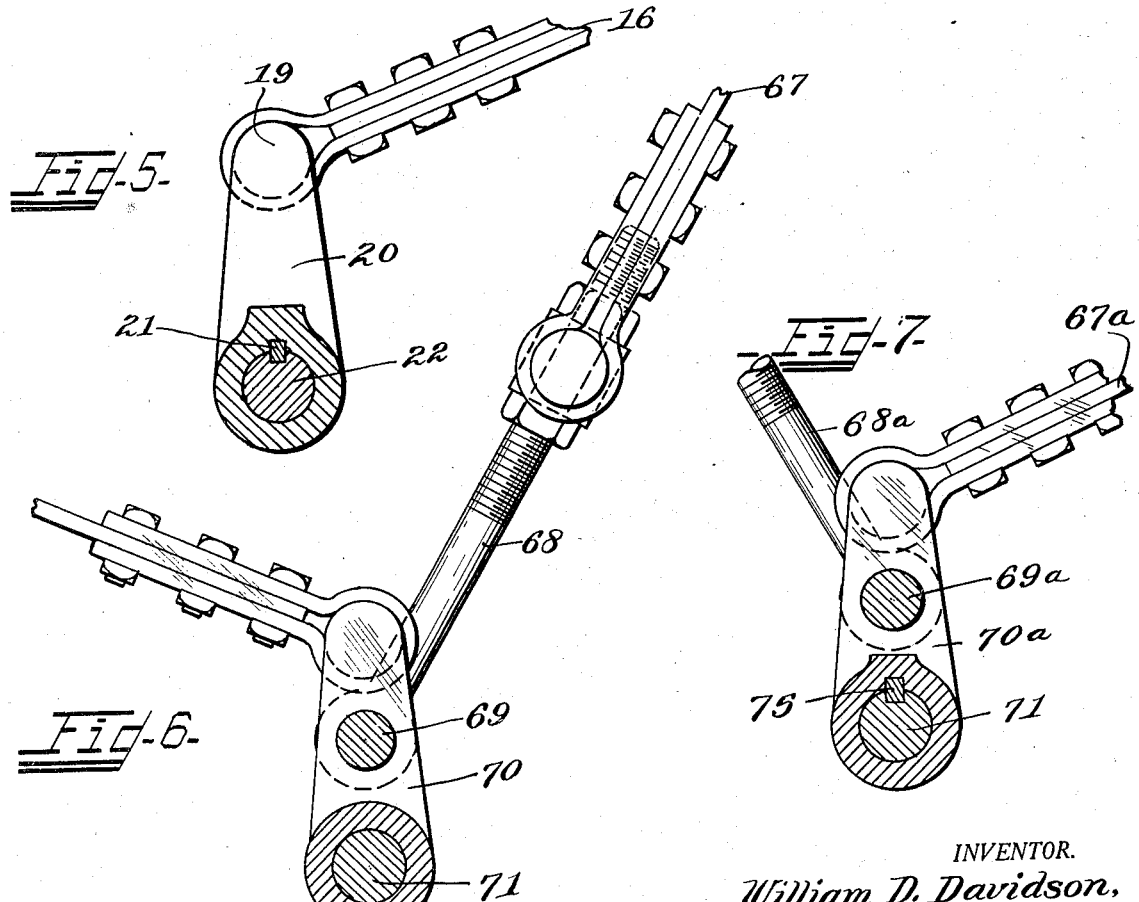

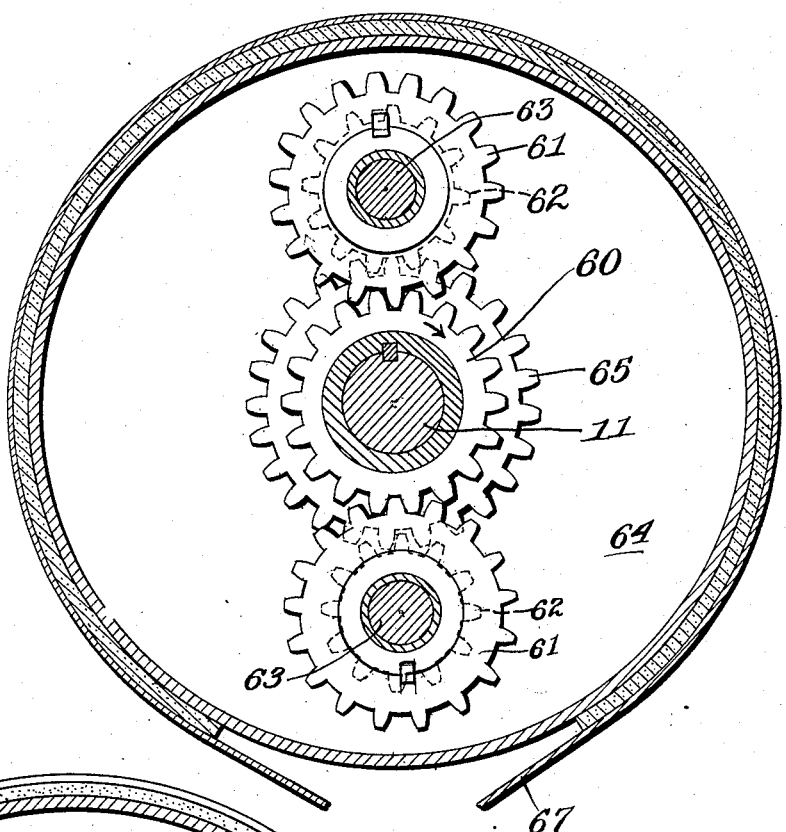
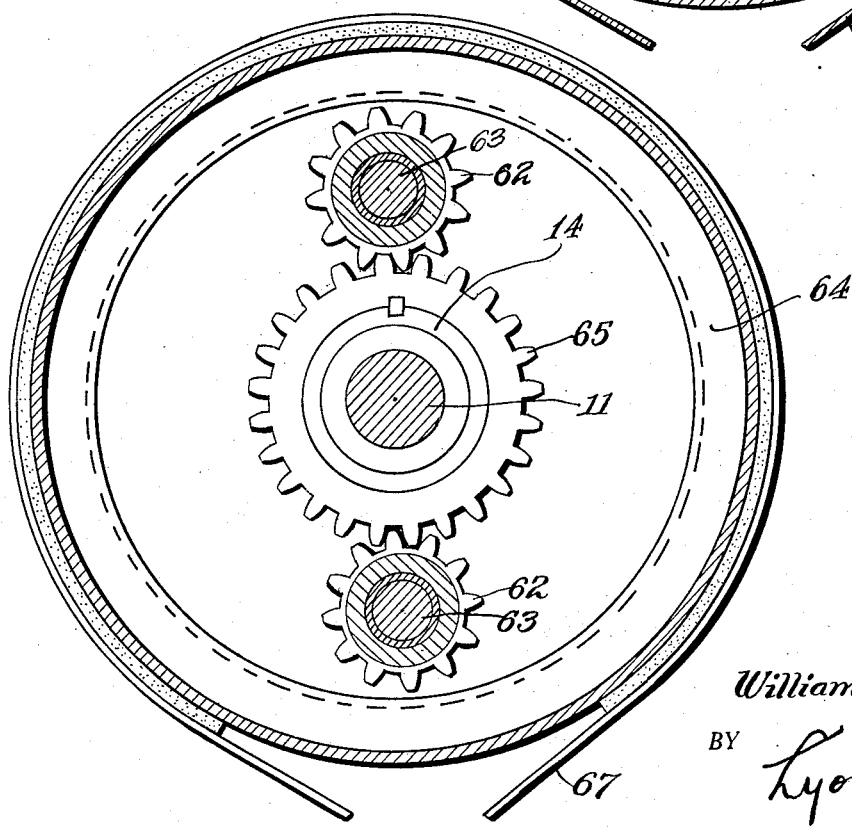

Patented Apr. 14, 1931

1,800,513

UNITED STATES PATENT OFFICE

WILLIAM D. DAVIDSON, OF LOS ANGELES, CALIFORNIA, ASSIGNOR TO UNION TOOL COMPANY, OF TORRANCE, CALIFORNIA, A CORPORATION OF CALIFORNIA

GEAR-REDUCTION DRAW WORKS

Application filed August 28, 1923. Serial No. 659,734.

This invention relates to draw works having two separate gear sets for obtaining two different speeds of the drum of said draw works.

An object of this invention is to provide a draw works that will eliminate use of the usual line shaft, chains, sprockets and jaw clutches employed in driving a drum at lower and higher speeds. The drum shaft of the invention is provided with a sprocket wheel driven direct by the engine, and said drum shaft drives the drum through either one of two sets of reduction gears, one set at either end of the drum. The reduction gearing is of the planetary type, the gear cases freely rotating when not held against rotation by brake bands. When the brake bands are applied the gear cases remain stationary and the power is then transmitted through pinions carried by the gear cases to the drum shaft.

Another object of the invention is to make provision for permitting but one of the brake band operating pedals to be operated at one time. When either pedal is depressed the remaining pedal is locked and cannot be moved.

The accompanying drawings illustrate the invention:

Figure 1 is a front elevation, partly in section, of a gear reduction draw works constructed in accordance with the provisions of this invention, the clutches for connecting the engine driven sprocket with the rotary drive sprocket and the drum shaft being shown in neutral positions, and a portion of the brake band-operating lever being broken away.

Fig. 2 is an end elevation of Figure 1 from the left thereof.

Fig. 3 is a fragmental plan view of Figure 1, a portion of the brake-equalizing bar being broken away.

Fig. 4 is an enlarged elevation from the line indicated by 4—4, Figure 3.

Fig. 5 is an enlarged elevation, partly in section, from the line indicated by 5—5, Figure 3.

Fig. 6 is an enlarged elevation, partly in section, from the line indicated by 6—6, Figure 3.

Fig. 7 is an enlarged elevation, partly in section, from the line indicated by 7—7, Figure 3.

Fig. 8 is an enlarged sectional elevation from the line indicated by 8—8, Figure 1.

Fig. 9 is an enlarged sectional elevation from the line indicated by 9—9, Figure 1.

Referring to the drawings, there is provided a drum shaft 11 journaled in bearings 12 which are mounted on a suitable supporting frame 13. Rotatably mounted on the shaft 11 is a drum 14. The drum 14 is provided at its opposite ends with brake drums 15 each of which is provided with a brake band 16. The brake bands 16 are operated by any suitable mechanism, for example, as follows:

The brake bands 16 are adjustably anchored at one end by screws 17 and nuts 18 to the frame 13. The other end of one of the brake bands 16 is pivotally connected at 19 to an arm 20 which is keyed at 21 to a rock shaft 22 mounted in bearings 23 supported by the frame 13. Journaled on the shaft 22 is a tubular shaft 24 which is pivotally connected at 25 to the other end of the other brake band 16. The tubular shaft 24 is interposed between one of the bearings 23 and a collar 26 fixed to the shaft 22, thus preventing relative endwise movement between the shafts 22, 24. The arm 20 is interposed between the other bearings 23, thus preventing endwise motion of the shaft 22. The shaft 24 and collar 26 are provided with arms 27 which are pivoted at 28 to U-links 29, that in turn, engage other U-links 30. The U-links 30 are pivoted at 31 to a pressure equalizing bar 32 which in turn is pivotally connected at 33 to a link 34. The equalizing bar 32 is broken away at one end in Figure 3 in order to permit full illustration of the structure of the draw works, but its left end is connected to the left arm 27 of the collar 26 in the same manner as its right and is connected by the U-link 30 to the arm 27 secured to the tubular shaft 22. The link 34 is pivoted at 35 to a hand lever 36. It will be clear that the hand lever 36 can be operated to apply the brake bands 16 to the brake drums 15 to slow up and stop the drum 14.

Rotatably mounted on the shaft 11 is a sprocket wheel 37 adapted to be driven by a prime mover, not shown. Preferably the sprocket wheel 37 rotates upon a bronze bushing 38 instead of directly on the shaft 11. This sprocket wheel 37 transmits power from the prime mover to the shaft 11 through a clutch, one of the clutch members being indicated at 39 on the hub of the sprocket wheel 37, and the cooperating clutch member at 40. The clutch member 40 is splined to the shaft 11 at 41. The clutch member 40 is operated by the usual shifting fork 42 which is pivoted at 43 to a connecting rod 44 that in turn is pivoted at 45 to one end of a foot operated lever 46 fulcrumed at 47 on the frame 13. The lever 42 is fulcrumed at 421 on the frame 13 and is normally held by a spring 422 in position to disengage the clutch 39, 40.

Also rotatably mounted on the bushing 38 is a sprocket wheel 48 which may be connected by a sprocket chain, not shown, to a rotary machine, not shown, of the type employed in drilling wells by the rotary method. That is to say, the rotary machine is driven through the agency of the sprocket wheel 48 that is driven by the sprocket wheel 37 through a clutch, one member 49 of which is on the hub of the sprocket 48 and the other member 50 of which is splined to the elongated hub 51 of the sprocket wheel 37. The clutch member 50 is operated by the usual shifting fork 52 which is fulcrumed at 53 on the frame 13. The shifting fork 52 is pivoted at 54 to a connecting rod 55 which is pivoted at 56 to an operating lever 57 that is fulcrumed at 58 on the frame 13. The lever 57 will be adjustably held in different positions by the usual quadrant and ratchet device indicated in general by the character 59, such devices being well understood in the art relating thereto and, therefore, not requiring detailed description herein. The lever 57 is normally held by a spring 571 in position to disengage the clutch 49, 50. It will be clear that, to operate the rotary machine, the lever 57 will be moved to the left in Figure 1, thus operatably connecting the sprocket wheel 48 to the engine driven sprocket wheel 37.

One of the gear sets will now be described. Keyed therefore to the drum shaft 11 is a spur gear wheel 60 which is in mesh with a spur pinion or pinions 61, there being two of such pinions, in this instance, in preference to one to obtain balance of the rotating mass. The pinions 61 are keyed on the hubs of other spur pinions 62 which are mounted on shafts 63. The shafts 63 are carried by a gear case 64. The pinions 62 are in mesh with a spur gear wheel 65 which is keyed to the drum 14. It will be seen that, if the gear case 64 is not held against rotation, turning of the gear wheel 60 by the shaft 11 will effect planetary rotation of the pinions 61, 62 and consequent rotation of the gear case 64.

In order to prevent rotation of the gear case, when it is desired that the pinions 61, 62 rotate on their own axes so as to drive the gear wheel 65, the periphery of the gear case 64 constitutes a brake drum 66 which is provided with a brake band 67. The brake band 67 is provided at one end with adjusting screws 68 which are pivotally connected at 69 to a crank arm 70 rotatably mounted on a rock shaft 71 that is mounted in bearings 72 carried by the frame 13. The other end of said brake band is provided with an eye for pivotal connection with the crank arm 70. When the crank arm 70 is turned clockwise in Figure 6, the brake band will be tightened. The crank arm 70 constitutes one arm of a lever of which the other arm is indicated at 73. The lever arm 73 constitutes a foot pedal for tightening of the brake band. The foot pedal 73 is normally raised, in position to expand the brake band 67, by a coil spring 74 which is connected at one end to the pedal 73 and at its opposite end to the frame 13.

The gear set just described is at the left end of the drum 14 in Figs. 1 and 3 and is substantially duplicated at the opposite end of the drum 14 and the duplicated elements thereof will be indicated by the same reference characters with the addition of the letter indices a. In this second gear set, however, the crank arm 70a instead of being rotatably mounted on the rock shaft 71 is keyed to said shaft, as indicated at 75 in Figure 7.

In practical operation of the invention, assuming that the prime mover is rotating the sprocket wheel 37, if it be desired to operate the rotary machine, not shown, the clutch 39, 40 will be disengaged and the clutch 49, 50 engaged. If, however, it be desired to effect operation of the draw works, the clutch 49, 50 will be disengaged and the clutch 39, 40 engaged, thus rotating the shaft 11. Then the drum 14 will be operated at one speed or another, according as the operator desires, by contraction of the brake band 67 or the brake band 67a. The two trains of gears provided at the opposed ends of the drum 14 provide different ratios of drive between the drum shaft 11 and the drum 14. By variation of these dimensions of the gears in the respective trains, a multiple speed drive is provided between the shaft 11 and the drum 14.

Means are provided to prevent operation of either of the foot pedals when the other one is depressed, so as to avoid injury to the machine. To effect this there is provided a rock shaft 76 mounted in a bearing 761 and having a pair of arms 77, 78 constituting abutments, said arms projecting in opposite directions from the shaft 76 and in the path of downward movement of the foot pedals 73, 73a, respectively. Thus, when the pedals 73 is depressed, it depresses the arm 77 and elevates the arms 78 into position against the under face of the pedal 73a, as in Figure 4, preventing depression of the pedal 73a. When, however, the operator treads upon the pedal 73a, said pedal depresses the arm 78 and elevates the arm 77 into engagement with the under face of the pedal 73, thus to prevent depression of the pedal 73.

I claim:

1. A draw works comprising a rotatably mounted shaft, a drum loose on said shaft, sprocket wheels loose on the shaft, clutch means between the sprocket wheels, clutch means between one of the sprocket wheels and the shaft, and means operated by rotation of the shaft to rotate the drum.

2. A draw works comprising a shaft, a drum operatably connected with said shaft, a sprocket wheel loose on the shaft adapted for connection with a rotary drilling machine, a second sprocket loose on the shaft spaced from the first mentioned sprocket and adapted for connection with a prime mover, a clutch member on one of the sprockets, a clutch member adapted to cooperate with the first mentioned clutch member and splined on the hub of the other sprocket, means to move the second mentioned clutch member to and from engagement with the first mentioned clutch member, a third clutch member on one of the sprockets, a fourth clutch member splined to the shaft, and means to move the fourth clutch member to and from engagement with the third clutch member.

3. In a rotary draw works, the combination of a frame, a shaft journaled in bearings secured to the frame, a drive sprocket journaled on the said shaft, clutch means for disengageably securing the said sprocket to the shaft, a rotary drive sprocket journaled on the said shaft, clutch means for releasably establishing a driving connection between the first said sprocket and the rotary drive sprocket, a drum mounted on the shaft, and speed reducing gears between the said drum and shaft for driving the said drum from the said shaft when the said rotary drive sprocket is disengaged from the said shaft, and the drive sprocket is engaged therewith.

4. In a rotary draw works, the combination of a frame comprising spaced apart vertically extending posts, a shaft journaled in bearings transversely of the said posts, a drive sprocket journaled on the said shaft, clutch means for disengageably securing the said sprocket to the shaft, a rotary drive sprocket journaled on the said shaft, clutch means for releasably establishing a driving connection between the first said sprocket and the rotary drive sprocket, the said drive sprocket and rotary drive sprocket and the said clutch means being mounted on the said shaft intermediate a pair of the posts on the said frame, a drum journaled on the said shaft between a second pair of posts on the said frame, and speed reduction gears between the said drum and shaft for driving the said drum from the said shaft when the said rotary drive sprocket is disengaged from the said shaft.

5. In a rotary draw works, the combination of a frame, a shaft journaled in bearings secured to the said frame, a drive sprocket journaled on the said shaft and adapted to be connected with a prime mover, clutch means for disengageably securing the said sprocket to the said shaft, a rotary drive sprocket journaled on the said shaft, clutch means releasably establishing a driving connection between the first said sprocket and the rotary drive sprocket, independent actuating means for the clutch means pivotally supported by the said frame and extending to a point of accessibility at the same end of the said frame, a drum mounted on the said shaft, and speed reduction gears between the said drum and the said shaft for driving the said drum from the said shaft when the said rotary drive sprocket clutch means is actuated to disengage the said rotary drive sprocket from the said shaft, and the drive sprocket is engaged therewith.

6. A draw works comprising a pair of spaced posts, a shaft journaled in bearings on the posts, a hoisting drum journaled on the shaft, means for driving the shaft, a rotary drive sprocket mounted on the shaft, clutch means for releasably establishing a driving connection between the means for driving the shaft and the rotary drive sprocket, and a multiple speed drive means between the shaft and drum.

Signed at Torrance, Calif., this 20th day of August, 1923.

WILLIAM D. DAVIDSON.